Jan. 14, 1969 E. F. MARTINA 3,422,264
DEVICE FOR PRODUCING STEREOSCOPIC RADIOGRAPHS
Filed Jan. 14, 1966
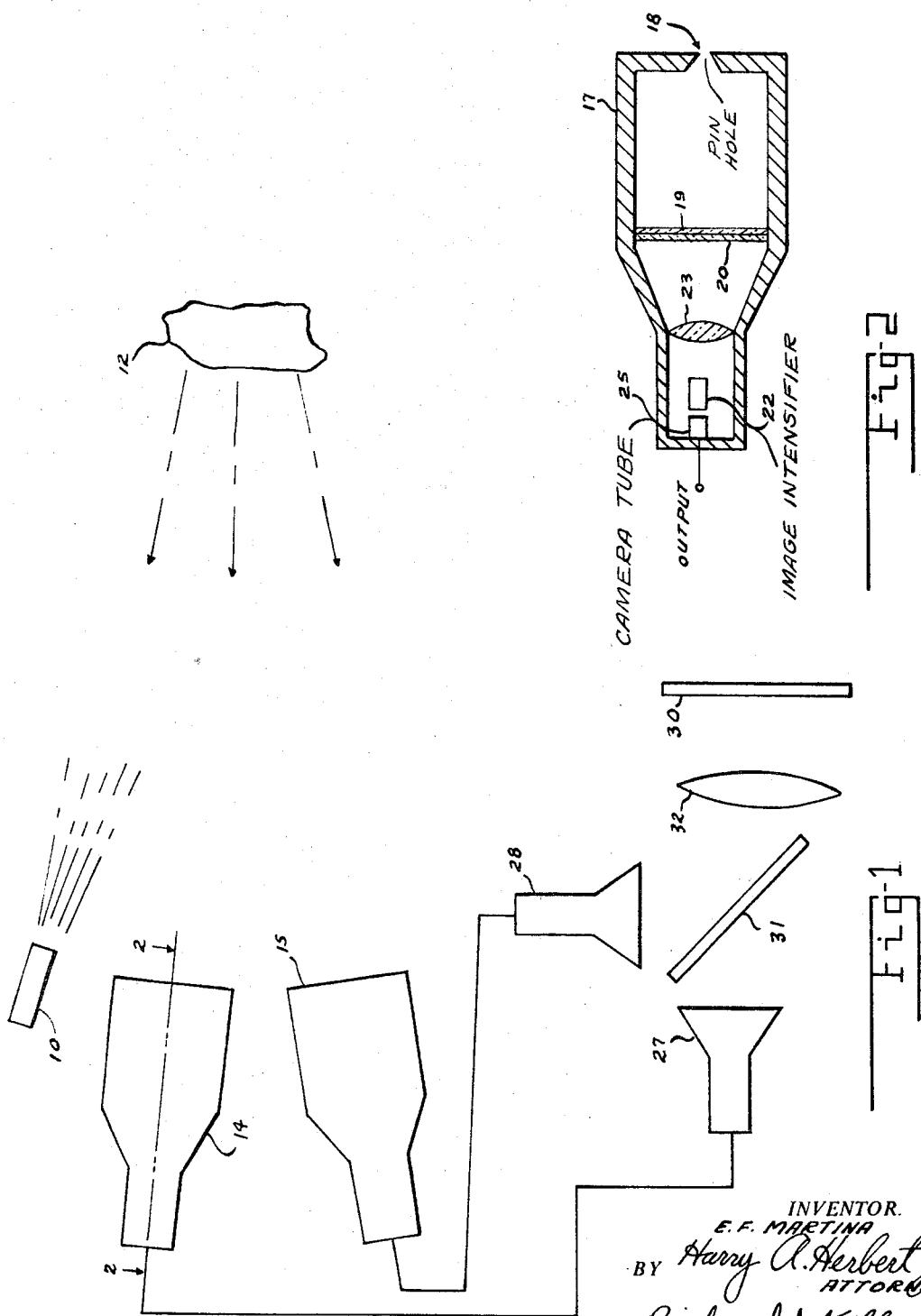
INVENTOR.
E. F. MARTINA
BY Harry A. Herbert Jr.
ATTORNEY
Richard J. Killoren
AGENT

United States Patent Office 3,422,264
Patented Jan. 14, 1969

3,422,264
DEVICE FOR PRODUCING STEREOSCOPIC RADIOGRAPHS
Eugene F. Martina, Palos Verdes Estates, Calif., assignor to the United States of America as represented by the Secretary of the Air Force
Filed Jan. 14, 1966, Ser. No. 521,250
U.S. Cl. 250—61
Int. Cl. G01n 23/04; H01j 37/22; H01j 39/32
2 Claims

ABSTRACT OF THE DISCLOSURE

The object for which a radiograph is desired is irradiated with neutrons from a neutron source which results in an isotropic emission of gamma rays from the object. A pair of pin hole cameras are located on the same side of the object as the neutron source to receive the returned gamma rays. Each of the pin hole cameras has a phosphorescent screen therein which produces an image of the object. The image on each of the phosphorescent screens is imaged onto the input of an image intensifier tube with the outputs of the image intensifier tubes being applied to the inputs of television camera tubes. The outputs of the camera tubes are supplied to a pair of display tubes with the outputs of the display tubes being combined on a display screen.

---

This invention relates to a device for producing stereoscopic radiographs of massive objects.

One object of the invention is to provide a device wherein the radiation source and the detector are placed on the same side of the object to produce stereoscopic radiographs with the use of pin hole cameras.

This and other objects will be more fully understood from the following description taken with the drawing wherein:

FIG. 1 is a schematic showing of a stereoscopic radiograph system according to the invention; and FIG. 2 is an enlarged partially schematic sectional view of one of the cameras of the device of FIG. 1 taken along the line 2—2.

An X-ray source for same-side radiography of massive objects cannot be used because backscattered and fluorescent X-rays cannot exceed 250 and 120 kv. respectively, and therefore are strongly absorbed. Neutrons, however, when injected into the object result in the emission of gamma rays of several mev. energy due to nuclear fluorescence and radiative capture. The gamma rays are emitted nearly isotropically so that the object can be viewed at a backward angle without loss of sensitivity.

According to this invention, use is made of two pin hole cameras to provide stereoscopic radiographs. The pin hole cameras and neutron source are placed on the same side fo the object. The gamma radiation from the target produces images of the object on phosphorescent screens within the pin hole cameras. The images from the phosphorescent screens are then imaged upon the input screens of image intensifier tubes. The outputs of the image intensifiers may then be scanned by means of television cameras to provide stereoscopic pictures on a display screen. Also, the outputs of the image intensifiers may be used to illuminate a film if desired.

Reference is now made to FIG. 1 of the drawing, wherein a neutron source is shown schematically at 10. Neutrons from source 10 irradiate an object shown schematically at 12. The gamma rays from the object are detected by aa pair of pin hole cameras 14 and 15, the construction of which will be explained with respect to FIG. 2.

Since the two pin hole cameras are identical only one will be described. As shown in FIG. 2, each pin hole camera has a housing 17 with a pin hole 18 therein. The housing 17 is made of a material such as lead or steel or material opaque to gamma radiation. A phosphorescent screen 19 is mounted on a transparent support 20 within the housing 17, in energy receiving relation to the pin hole 18. The output of screen 19 is imaged upon the input of an image intensifier, shown schematically at 22, by means of a lens 23. The output screen of the image intensifier is scanned by a television camera tube shown schematically at 25. As shown in FIG. 1, the outputs of the television camera tubes may be supplied to a pair of display tubes shown schematically at 27 and 28. The outputs of the display tubes 27 and 28 are combined to provide a stereoscopic display on screen 30 by means of half-silvered mirror 31 and lens 32. Though not shown, it is obvious that the scanning in the camera tubes and display tubes must be synchronized.

In the operation of the device of the invention, the object is irradiated by neutrons from the neutron source 10 and gamma rays are emitted substantially isotropically by the object and passed through the pin holes 18 in cameras 14 and 15 to produce images of the object on the phosphorescent screens 19. The output of each screen 19 is then imaged on the input of the corresponding image intensifier 22. The output of each image intensifier 22 is scanned by means of television cameras 25. The outputs of the camera tubes 25 are supplied to display tubes 27 and 28 and the stereoscopic image is displayed on screen 30.

There is thus provided a device for producing stereoscopic radiographs, wherein the radiation source and detector are placed on the same side of the object.

While a specific embodiment of the invention has been described, it is obvious that numerous changes may be made without departing from the general principle and scope of the invention.

I claim:

1. A device for producing stereoscopic radiographs of massive objects, comprising means for irradiating an object with neutrons to thereby produce gamma radiation from said object; a pair of pin hole cameras located in energy receiving relation to said object; each of said cameras having a phosphorescent screen, supported therein, in energy receiving relation to the pin hole; an image intensifier tube within each of said cameras; means, within each of said cameras, for imaging the output of said phosphorescent screens on the input of said image intensifiers; means, responsive to the output of said image intensifiers, for producing a stereoscopic image of said object.

2. The device as recited in claim 1, wherein the means for producing a stereoscopic image of the object comprises a pair of television display tubes; a pair of television camera tubes responsive to the output of said image intensifiers connected to said television display tubes; a display screen and means, between said television display tubes and said display screen, for combining the output of said display tubes to produce a stereoscopic display on said display screen.

References Cited

UNITED STATES PATENTS 2,983,835   5/1961   Frey.
3,076,054   1/1963   Simon _____ 250—60 X
3,210,545   10/1965  Barnett _____ 250—83.3

WILLIAM F. LINDQUIST, *Primary Examiner.*

U.S. Cl. X.R.

250—83.1